US00RE36539E

United States Patent [19]

Quick

[11] E Patent Number: Re. 36,539

[45] Reissued Date of Patent: Feb. 1, 2000

[54] SEAL AND INSTALLATION IMPROVEMENTS

[75] Inventor: John Quick, Hillsdale, Canada

[73] Assignee: Hunter Technologies Inc., Canada

[21] Appl. No.: 08/908,722

[22] Filed: Aug. 8, 1997

Related U.S. Patent Documents

Reissue of:

[64] Patent No.: 5,551,414
Issued: Sep. 3, 1996
Appl. No.: 08/396,710
Filed: Mar. 1, 1995

[30] Foreign Application Priority Data

Sep. 27, 1994 [CA] Canada ..... 2133052

[51] Int. Cl.[7] ..... F24C 3/00

[52] U.S. Cl. ..... 126/85 B

[58] Field of Search ..... 52/219; 285/201, 285/200, 208; 126/85 B, 307 R, 312; 16/2.2

[56] References Cited

U.S. PATENT DOCUMENTS

| | | | |
|---|---|---|---|
| 1,803,894 | 5/1931 | Cross . | |
| 2,308,965 | 1/1943 | Riesing | 16/2 |
| 2,647,774 | 8/1953 | Newberry, Jr. | 286/16 |
| 2,665,146 | 1/1954 | Berg et al. | 285/30 |
| 2,874,981 | 2/1959 | Brady | 285/238 |
| 2,948,773 | 8/1960 | Hawes | 16/2 |

(List continued on next page.)

FOREIGN PATENT DOCUMENTS

| | | | |
|---|---|---|---|
| 926488 | 10/1947 | France | 5/3 |
| 2116781 A | 9/1983 | United Kingdom . | |

OTHER PUBLICATIONS

Photocopy of a Flyer of Rinnai America Corp. Entitled Rinnai's New Vented Heater, 1993.

Photocopy of Rinnai Gas Direct Vent Wall Furnaces Owner's Information Manual for Energysaver RHFE–551FA, RHFE–100 FA/VA, undated.

Photocopy of Flyer Hunter Enterprises, Orillia Ltd. entitled Hunter Sealed Combustion Heater, Oct. 31, 1990.

Photocopy of Brochure Entitled Modulating Gas Heating From Gaz Metropolitan, undated.

(List continued on next page.)

*Primary Examiner*—Carroll B. Dority

*Attorney, Agent, or Firm*—Fitzpatrick, Cella, Harper & Scinto

[57] ABSTRACT

A direct vent gas baseboard heater has field installable concentric air intake tube and exhaust pipe. The intake pipe and exhaust tube can be cut separately from the remainder of the heater, improving the efficiency of installation. They can also be transported aligned with the remainder of the heater, reducing packaging size. The manufacturer can provide a single size of tube and pipe for a variety of installation situations. The tube connects to a base cabinet through a key hole configuration of tabs and cuts, and is twisted until the tabs meet stops in the base cabinet. An extrusion in an air box in the base cabinet is brought against a gasket on a flange on the tube, fixing the tube and sealing it with the air box. The exhaust tube has a threaded end and is threaded into an exhaust outlet in the air box, sealing is to a heat exchanger. A vent seal kit creates a seal assembly having a resiliently deformable ring seal extending into a wall sleeve with straps. The assembly is inserted ring first into a hole in a structure which deforms the seal by bending it back. When the seal engages through the structure, it rebounds to its original position and the straps are pulled. This brings the seal into contact with the exterior wall, sealing it. Insulation is sprayed from the interior about the wall sleeve, sealing the internal cavity. An O-ring is slipped over the intake tube previously installed on the heater. The intake tube and exhaust pipe are inserted through the wall sleeve, sealed to the wall sleeve by the O-ring. The seal assembly allows the entire installation process to take place from the interior and is particularly advantageous for high-rise installations.

9 Claims, 9 Drawing Sheets

U.S. PATENT DOCUMENTS

| | | | |
|---|---|---|---|
| 3,076,668 | 2/1963 | Famely | 285/159 |
| 3,199,504 | 8/1965 | Morin et al. | 126/85 B |
| 3,234,930 | 2/1966 | Hodges | 126/90 |
| 3,428,040 | 2/1969 | Baker et al. | 126/110 |
| 3,518,359 | 6/1970 | Trimble et al. | 16/2 |
| 3,550,579 | 12/1970 | Baker | 126/307 |
| 3,674,005 | 7/1972 | Barnett et al. | 126/91 A |
| 3,844,588 | 10/1974 | Jocsak | 285/162 |
| 4,033,534 | 7/1977 | Bergkvist | 248/49 |
| 4,187,835 | 2/1980 | Finney | 126/360 R |
| 4,234,218 | 11/1980 | Rogers | 285/162 |
| 4,295,691 | 10/1981 | Rubenthaler | 308/238 |
| 4,869,229 | 9/1989 | Johnson | 126/91 A |
| 4,869,230 | 9/1989 | Fletcher | 126/91 |
| 4,901,395 | 2/1990 | Semrau | 16/2 |
| 4,929,173 | 5/1990 | Jacobs et al. | 431/215 |
| 5,253,635 | 10/1993 | Overall et al. | 126/85 B |
| 5,280,138 | 1/1994 | Preston et al. | 174/152 G |
| 5,282,456 | 2/1994 | Smeker et al. | 126/85 B |

OTHER PUBLICATIONS

4 Page Photocopy of Brochure entitled: "The Baseboard Direct Vent Wall Furnace", by the Empire Stove Co. Belleville Illinois, undated.

Photocopy of an Article Which Appeared in an Unknown Publication Printed in the USA Form S–GB, Entitled "Baseboard Gas Heaters by Siegler", For the Siegler Heater Division, Centralia, Illinois, Undated.

Photocopy of an 8 Page Instruction Manual For Installation Operation Instructions, For a Siegler Model LSB 10–2D Sealed Combustion Gas Baseboard Heater, Lear Siegler (Canada) Ltd., Orillia, Ontario (LSC–2259–A), Undated.

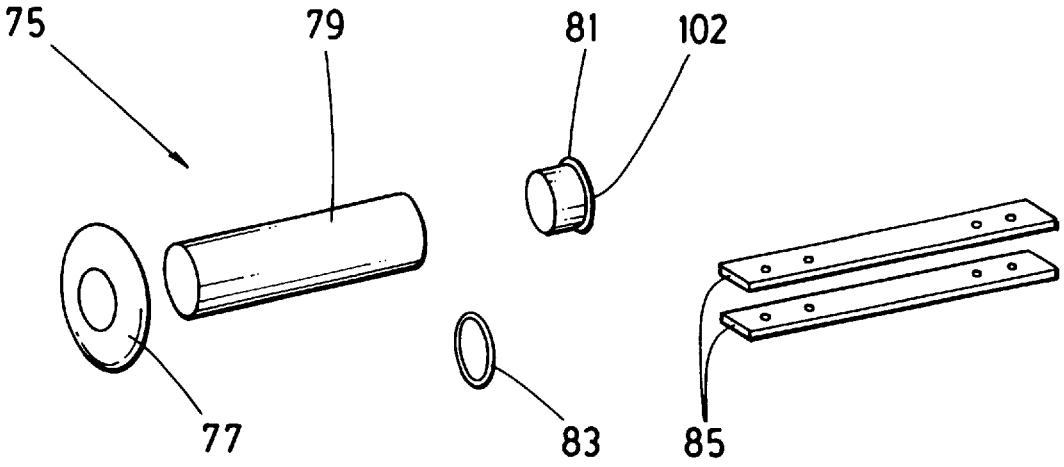
FIG. 9
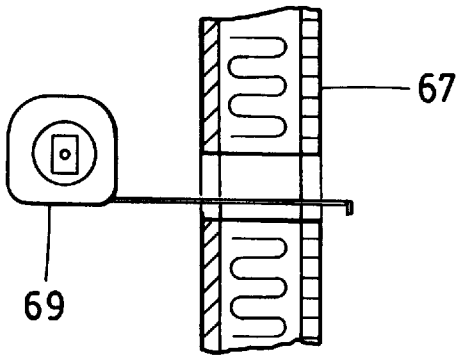
FIG. 8A
FIG. 8B
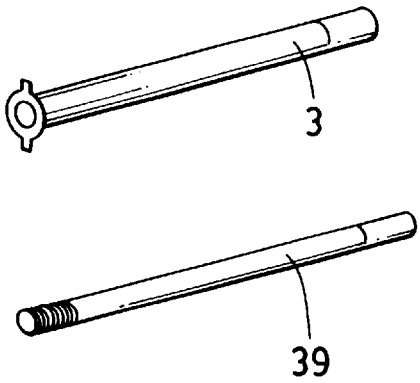
FIG. 8C

SEAL AND INSTALLATION IMPROVEMENTS

Matter enclosed in heavy brackets [ ] appears in the original patent but forms no part of this reissue specification; matter printed in italics indicates the additions made by reissue.

FIELD OF THE INVENTION

The inventions relates to improvements in creating sealed holes and installing appliances through a structure. More particularly and without limitation, it relates to creating sealed holes and installing vents for gas appliances through walls, including gas baseboard heaters.

BACKGROUND OF THE INVENTION

Great strides have been made in recent years to develop direct vent gas appliances. Rather than obtaining combustion air from the space in which the appliance is located, the combustion chamber of a direct vent appliances is sealed from the space and takes its combustion air from the outside. This increases the safety, efficiency and environmental comfort provided by the appliance. The exhaust from the appliance is, of course, also vented to the outside.

Typically, a concentric inlet-outlet configuration is used for the incoming combustion air and the outgoing exhaust gases. The exhaust gases are vented through an exhaust pipe at the centre of the configuration. An intake pipe surrounds, but is spaced away from the exhaust pipe. The combustion air is drawn in through the space between the exhaust pipe and the intake pipe.

The combustion air absorbs heat from the exhaust gases further increasing the efficiency of the appliance and reducing the temperature of the exhaust gases. The appliance is often provided with a fan to ensure that sufficient combustion air is drawn in and all of the exhaust gases are vented from the appliance. A fan-based appliance is known as a power vented appliance. Cool exhaust and power venting allow for an appliance to be vented through an exterior wall rather than the traditional manner of venting through the roof.

The ability to install appliances through the wall significantly increases the range of possible installation positions for the appliances. An appliance can now be installed in a single unit of a high-rise apartment building without other modifications to the structure. Retrofit applications are considerably easier. An appliance can be put into an existing house without having to run a chimney through the roof or up an exterior wall.

Unfortunately, transporting and installing these appliances is not yet without difficulty. In a gas baseboard heater of the type shown in U.S. Pat. No. 5,253,635 issued Oct. 19, 1993 to Overall et al the intake pipe and the exhaust pipe are fixed to the body of the appliance at the time of manufacture.

Walls have varying thickness, typically less than two feet, and the pipes need to project beyond the wall for proper venting. This means that the pipes are usually over two feet long. Although the portion of the Overall baseboard inside the space to be heated is stated to be approximately nine inches by five inches by four feet, the length of the pipes provide a transportation depth of well over two feet.

When installing the Overall unit a hole is cut in the wall and the depth of the wall is measured. For most installations, the length of the pipes will need to be cut to fit. A long length of pipe projecting from the exterior of the wall is undesirable as it is unsightly, has less strength than a small projection, and will provides a larger target for undesired bumping or buffeting. A straight cut cannot be made through both pipes as the exhaust gases would tend to re-enter the baseboard through the intake pipe. The exhaust pipe typically extends further from the wall than the intake to allow the exhaust gases to dissipate. Thus the intake pipe must be cut around the already in place exhaust pipe. As well the entire baseboard unit has to be lifted and positioned while the cutting takes place. This can be a cumbersome and inefficient process, and may even affect the size of pipe used in order to allow for a tube cutter or saw to fit around and between the pipes.

Other problems with installing appliances are maintaining access to the appliance after installation, insulating the wall, covering the cut surface of the wall aesthetically and functionally, and installing the unit entirely from the interior.

Referring again to the Overall baseboard, after the hole and pipe are cut then the baseboard heater is mounted on the wall with the pipes projecting through the wall. Screws or other mounting devices hold the baseboard heater in place. Unfortunately, the outside diameter of the pipes and the inside diameter of the hole are not likely to match exactly. If one could make the diameters of the hole and pipes the same then it would be difficult to fit the pipes through the hole. As well, opening up the interior cavity of the wall could create air flow problems within the building resulting in drafts or condensation problems. Insulation could be placed or sprayed outside the pipes into the wall cavity, however this has the dual drawback of requiring work to be performed from the outside because the baseboard heater is in the way in the interior, and fixing the unit in place, making removal difficult for repair or replacement.

After the hole is cut, there is an exposed area of the wall surrounding the pipes that needs to be protected. Again, insulation could be used, however this needs to be done from the outside and is unlikely to be aesthetically pleasing in any event. As well, the exterior surface may actually be chipped or roughened on the outside edge. This is particularly true because it is advisable to cut the hole in the wall from the interior, both to ensure proper placement and to avoid excessive damage to the interior surface when the tool is cutting the interior surface. Insulation may not be able to cover this type of damage. Repair work is time consuming and may require skills that the typical appliance installer does not have.

It is known to increase the size of the hole and insert a separate larger diameter pipe of approximately the same diameter as the hole. The pipe spans the internal cavity of the wall, sealing it off, and is held in place by a flange screwed to the interior surface of the wall. In order to protect the wall and seal the hole from the outside, another pipe is inserted from the outside into the first pipe. This second pipe is also held in place by a ranged screwed into the exterior wall. The flanges are made from metal and it is advisable to further seal the exterior flange using caulking compound. An example of this structure is described in the Installation Operation Instructions for the Siegler Model LSB 10-2D, previously published by Lear Siegler (Canada) Ltd. of Orillia Ontario, Canada. Although the Siegler product could be used to improve the installation procedure for the Overall baseboard, it is an inefficient procedure in terms of time, effort and materials, and it still does not provide an aesthetically pleasing finish or allow the heater to be installed entirely from the interior. Also, it is not possible to insulate the internal cavity as it is blocked after the first pipe is put in place.

Rinnai America Corp. of La Grange, Ga. has marketed direct vent gas wall heaters under model nos. RHFE-551A and RHFE-1001VA with vents that seal interior and exterior surfaces of the wall about the hole. The Rinnai vents are again installed partially from the interior and partially from the exterior. A plastic sleeve is cut to length and placed in the hole from the interior. The sleeve has a flange that is fixed to the interior surface of the wall using screws. An external terminal with a exhaust pipe and a flat seal is placed in the hole from the exterior. Straps are used from the interior, through the sleeve, to pull the vent toward the interior placing the seal against the exterior surface of the wall, the terminal into the sleeve, and the exhaust pipe near the interior wall. The manifold, separate from the rest of the baseboard heater is then pushed onto the exhaust pipe. Although the wall surfaces are sealed, it is not possible to insulate the internal cavity, nor is it possible to perform the entire operation from the interior.

Baker in U.S. Pat. No. 3,550,579 issued Dec. 29, 1970 entitled Flue Seal for Gas appliance and U.S. Pat. No. 3,428,040 issued Feb. 18, 1969 entitled Gas Heater describes flue seals that are installable from the interior. U.S. Pat. No. 3,428,040 uses a series of rubber rings around a telescoping pipe. When the telescoping sections are moved together, the rings are axially compressed and deform outwardly. This brings them into contact with the hole and seals the interior from the exterior. Recognizing the difficulty of choosing appropriate rings and installing them on site, Baker improved the seal as described in U.S. Pat. No. 3,550,579 by replacing the rings with a single tapered ring that forms a skin around the telescoping pipe. The skin has a wider diameter than the hole and is slightly deformed as it is inserted into the hole. This skirt quickly and efficiently forms the seal. Unfortunately, both Baker devices have minimal sealing ability and still do not protect the exterior surface of the wall or allow for insulation of the internal cavity of the wall.

It is an object of the present invention to provide improvements for the installation of appliances. The improvements are directed toward providing solution for problems in the art, including without limitation one or more of those problems described above.

The invention can have many different aspects as will be understood from the description provided below that provide different features of installation from one side of a structure, field customization and field installability.

In a first aspect the invention provides a seal that has a resiliently deformable ring. The ring has an internal circumference and an external circumference. The external circumference deforms inwardly when inserted into a hole of smaller diameter than the external circumference and the internal circumference remains constant when inserted into a hole of greater diameter than the internal circumference. The ring rebounds to its normal position when it emerges from the hole, and the ring substantially flattens when brought against a substantially flat surface.

In a second aspect the invention similarly provides a seal with a resiliently deformable ring having a normal position. The ring also has an internal circumference, an external circumference, an upper surface and a lower surface. Each surface extends about the internal circumference from the internal circumference to the external circumference. The ring has a thickness between the upper surface and the lower surface. In order to fit through a hole the ring is deformable by inwardly collapsing the second circumference. In order to seal the hole the ring is deformable by bringing the second circumference toward the first circumference until the lower surface is substantially flat without inwardly collapsing the second circumference.

The seal may have a tubular extension from the lower surface about the first circumference.

The seal of the first aspect or the one with the extension may be provided as part of a weather vent seal kit, along with a tubular sleeve of substantially the same outer contour as the internal circumference of the seal, and along with two straps.

The kit may form part of a seal assembly assembled by inserting the sleeve through the lower surface at the first circumference until it is substantially flush with the upper surface. The sleeve would be bonded to the ring.

The ring may be formed from rubber, while the sleeve may be a rigid pipe, possibly a PVC pipe.

In a third aspect a direct vent gas appliance has a field installable air intake tube and a base cabinet combination having corresponding manual insertion alignment and retention means. The appliance could further have an exhaust pipe and exhaust outlet combination having corresponding manual insertion alignment and retention means. Alternatively, the appliance of may have one or more corresponding key hole cuts and tabs for inserting one end of the tube into the base cabinet when the indentations and tabs are aligned. The keyhole cuts and tabs allow the tube to be rotated once inserted so that the cuts and tabs are no longer aligned. They prevent the tube from being removed from the base cabinet without re-aligning the cuts and tabs.

This last appliance may also have an exhaust pipe threaded on one end and a corresponding exhaust outlet in an air box connected to the base cabinet. The exhaust pipe would be threaded to the exhaust outlet.

In a fourth aspect the invention provides an appliance installation through a structure having a first surface and a second surface and a hole connecting the first and second surfaces. The installation has the above appliance and the ring of the second aspect. The appliance is installed against the first surface, and the intake tube and exhaust pipe extend from the appliance through the hole and the ring.

In a fifth aspect the invention also provides an appliance installation through a structure having a first surface and a second surface and a hole connecting the first and second surface. The installation also has the above appliance and it has one of the above seal assemblies. The seal assembly is installed through the hole with the ring substantially flattened against the second surface. The sleeve extends the depth of the hole to approximately the first surface. The straps retain the assembly in place relative to the structure. The appliance is installed against the first surface and the air intake has a O-ring on the outside of the air intake. The air intake extends from the appliance through the sleeve and beyond the ring. The O-ring seals the intake to the sleeve.

The structure may have an internal cavity about the sleeve that is insulated after installation of the sleeve.

In a sixth aspect the invention provides a kit of one of the above appliances with the pipe and tube disassembled from the remainder of the heater.

BRIEF DESCRIPTION OF THE DRAWINGS

For a better understanding of the present invention and to show more clearly how it may be carried into effect, reference will now be made by way of example to the accompanying drawings, which show the preferred embodiments of the present invention and in which:

FIG. 8(a) through (c) is a series of diagrammatic sketches showing the measurement for cutting of the air intake pipe and exhaust tube for the heater of FIG. 1.

FIG. 9 is a diagrammatic sketch of the components of a weather vent seal kit according to a portion of the preferred embodiment of the present invention.

DETAILED DESCRIPTION

Figure 1:
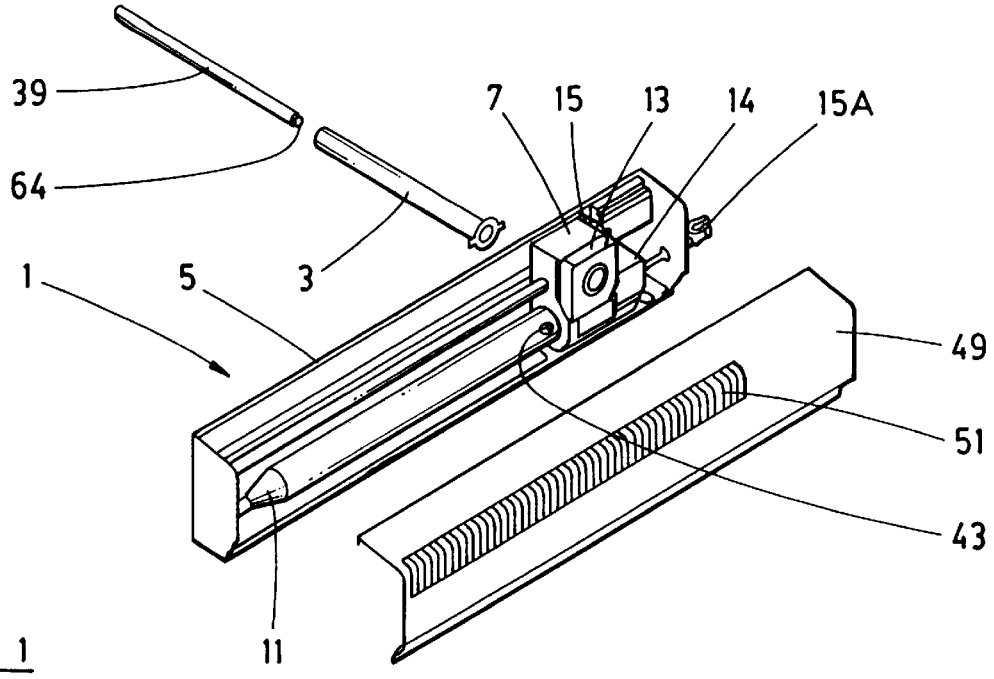
FIG. 1 is a partially exploded perspective view from in front, above and to the left of a gas baseboard heater incorporating a portion of the preferred embodiment of the invention.
Figure 3:
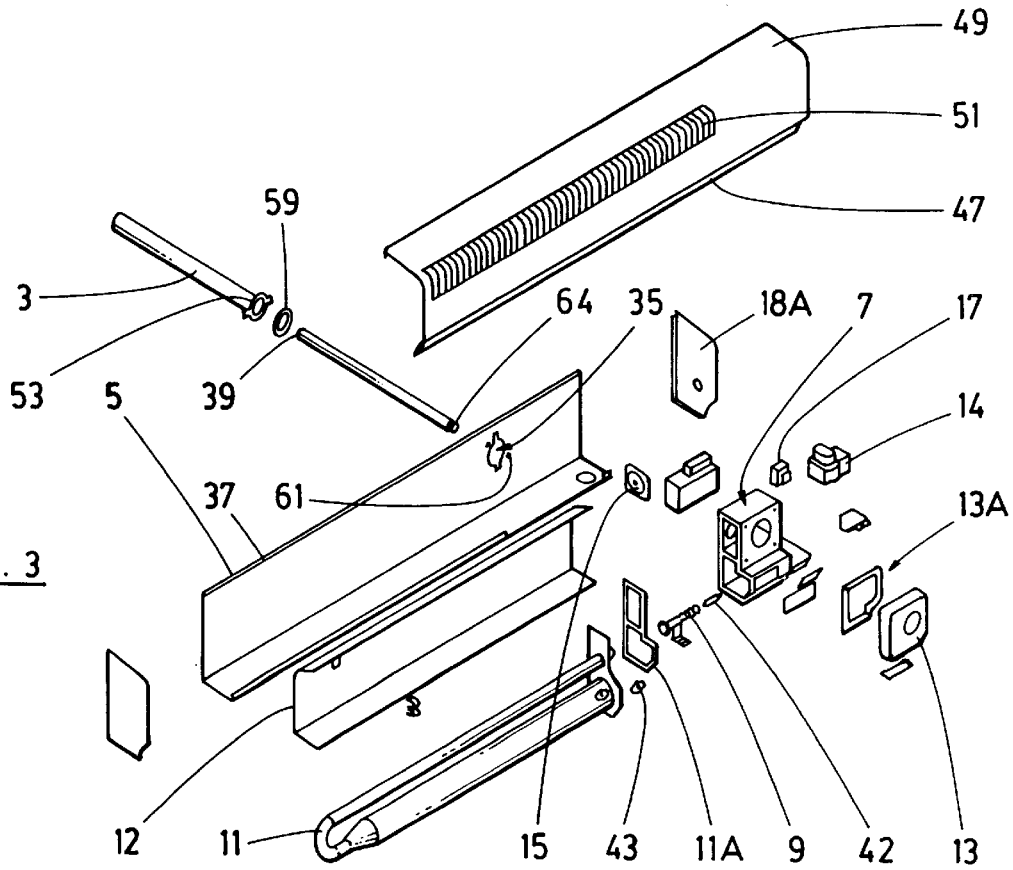
FIG. 3 is a fully exploded perspective view from in front, above and to the left of the heater of FIG. 1.
Figure 2:
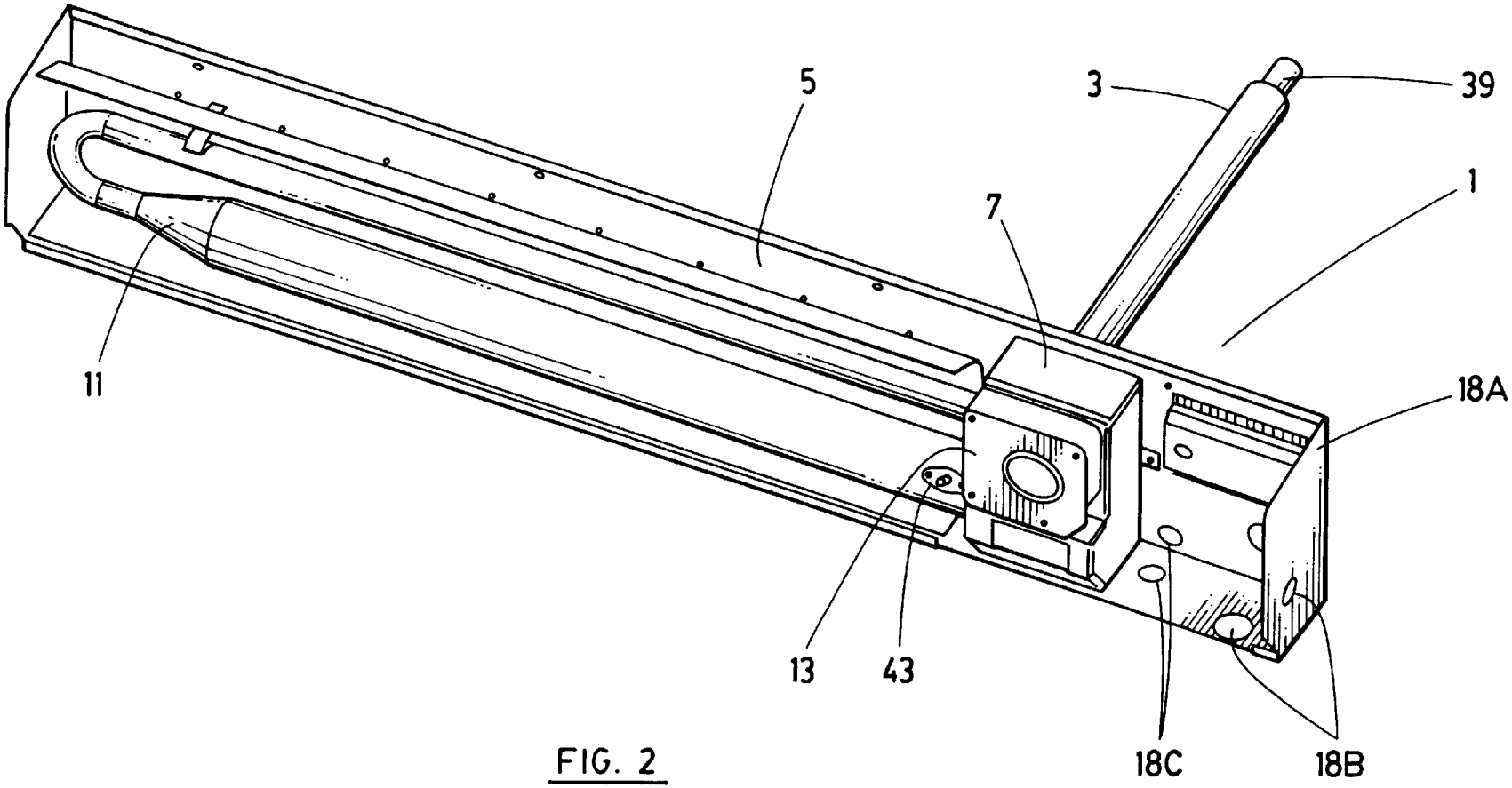
FIG. 2 is an internal perspective view from in front, above and to the right of a portion of the heater of FIG. 1, showing an assembled air intake pipe and exhaust tube.
Figure 6:
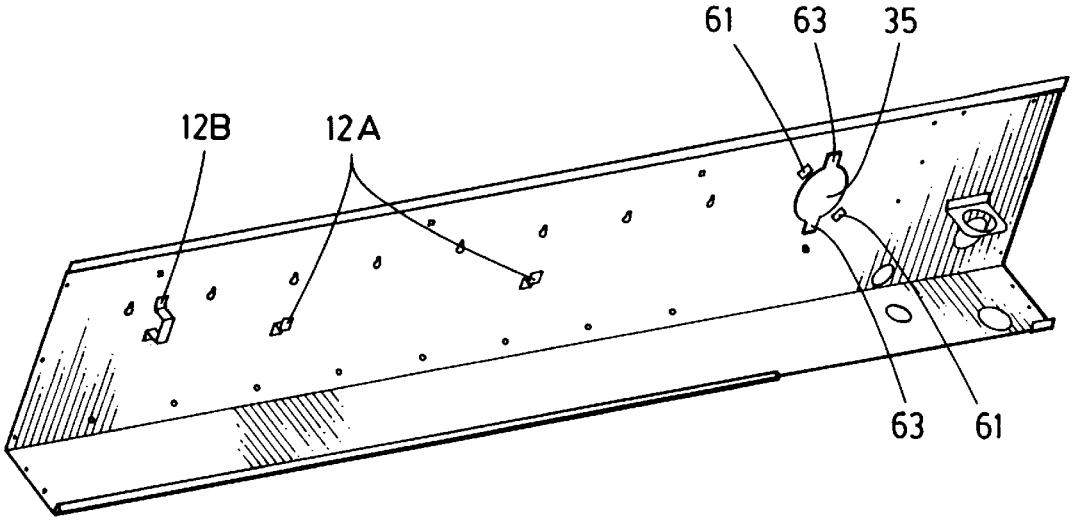
FIG. 6 is a perspective view from in front, above and to the left of a base cabinet of the heater of FIG. 1.

The general structure and operation of an improved gas baseboard heater will first be described, followed by specific improvements to air intakes, exhaust pipes and wall seals. Referring to FIGS. 1 through 3, a gas baseboard heater 1 is of the type described in the Overall et al patent discussed previously. An air intake tube 3 is connected to a base cabinet 5. The base cabinet is in turn connected to an air box 7. A burner 9 is inside the air box 7. A U-shaped heat exchanger 11 is connected to one side of the air box 7. There is a rubber gasket 11a between the heat exchanger 11 and the air box 7. Between the heat exchanger 11 and the base cabinet 5 is a heat shield 12. The heat shield is mounted on brackets 12a, while the heat exchanger 11 is retained at the U-shaped end by a clip, not shown, mounted on bracket 12b (FIG. 6).

A blower 13 is connected through a gasket 13a (FIG. 3) to the front of the air box 7, while a gas valve 14 is connected to the air box 7 opposite the heat exchanger 11. A pressure limit switch 15 is also connected to the air box 7, above the gas valve 14. The gas valve 14 is connected to a 90° ball type manual shut-off valve 15a (FIG. 1).

A 110 volt electrical supply, not shown, is connected to a junction terminal 16, from which power for all the components of the heater 1 is drawn. A transformer 17 steps the voltage down to 24 volts for use with an external 24 volt thermostat, not shown. Knockouts 18c are placed in the back and bottom of the base cabinet 5 for flexibility in installing electrical lines. Knockouts 18b are placed in the bottom and in an end plate 18a connected to the base cabinet 5 for flexibility in installing gas lines. Knockout 18d is placed in the back of the base cabinet 5 for a 24 volt line from a thermostat, not shown, but referred to again below. In FIG. 2, those components of the heater 1 that lie between the end plate 18a and the air box 7 are not shown so that the knockouts 18b, 18c, 18d are visible.

Figure 7:
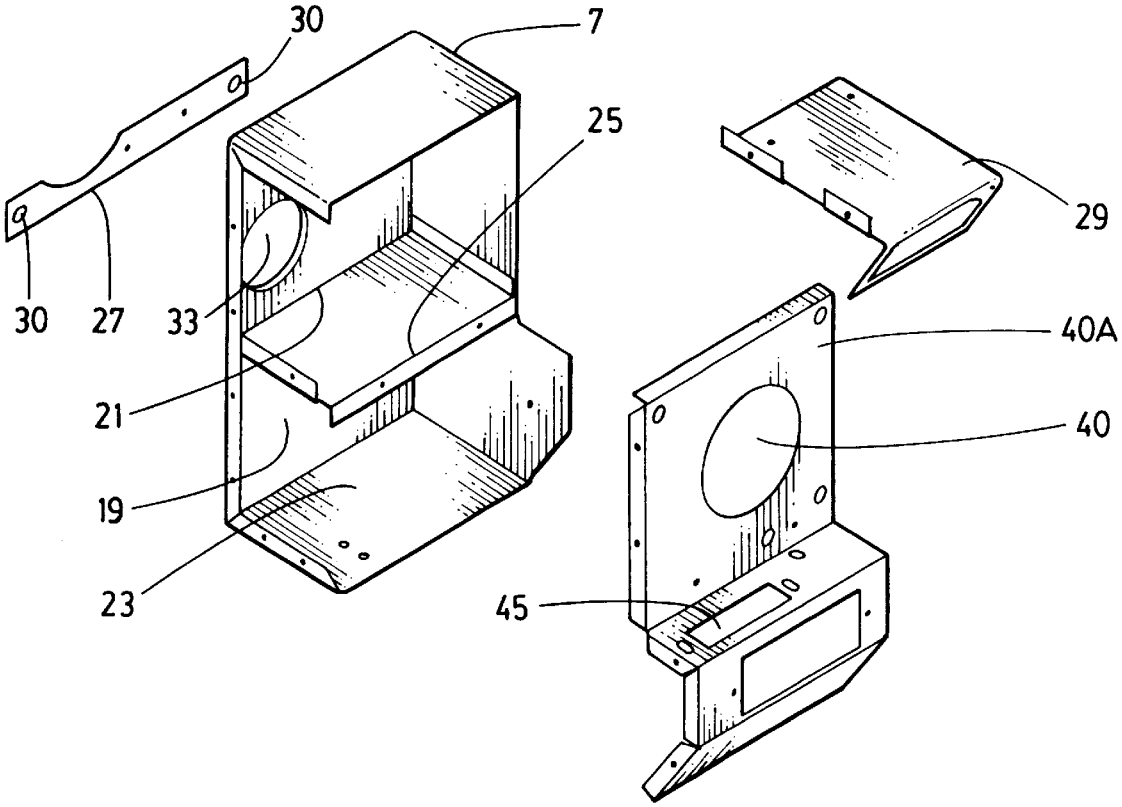
FIG. 7 is an exploded perspective view from in front, above, and to the left of an air box employed in the heater of FIG. 1.

Referring to FIG. 7, the air box 7 has a back 19 and is divided into an upper chamber 21 and a lower chamber 23 by a divider 25. A mounting bracket 27 is approximately one-quarter inch thick and is welded onto the rear of the air box 7, while an extension 29 is welded to the left of the air box 7. The extension 29 holds the transformer 17 and valve 14 of FIG. 3. The air box is mounted to the base cabinet 5 by screws or other fastening means through openings 30.

Figure 4:
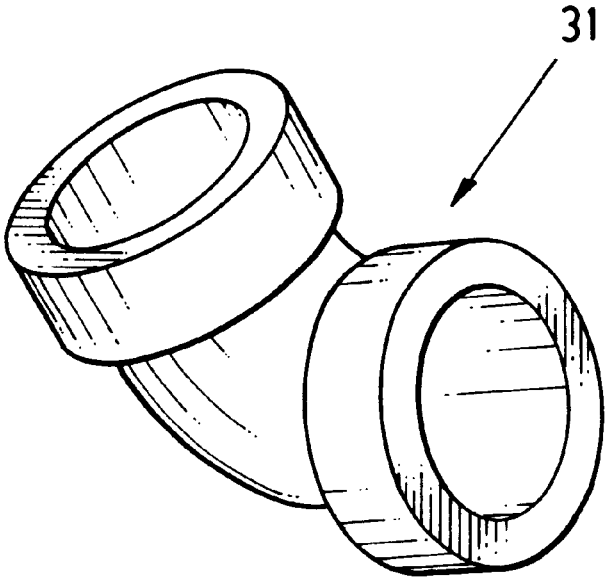
FIG. 4 is a perspective view of an exhaust elbow employed in the heater of FIG. 1.

Referring to FIGS. 1 through 3, the upper portion of the heat exchanger 11 terminates in the upper chamber 21, and, referring to FIG. 4, is provided with an exhaust elbow 31. The opposite end of the exhaust elbow from the heat exchanger 11 opens into an opening 33 in the back of the air box 7, which is in turn aligned with an opening 35 in the back 37 of base cabinet 5. The opening 33 is extruded outwardly, approximately one quarter of an inch. An exhaust pipe 39 is connected to the elbow 31 through the air intake tube 3 and the openings 33, 35. The blower 13 has fluid connection to the upper chamber 21 through another opening 40 in an air box front 40a.

The lower chamber 23 contains the gas burner 9 which is of the in-shot type with a venturi for efficiently mixing the gas with primary air and directed into the lower portion of the heat exchanger 11. It 23 also contains a gas orifice 42 for regulating gas flow. A hot surface igniter 43 extends through the heat exchanger 11 near the operating end of the burner 9. The hot surface igniter 43 is best mounted by metal screws or some other heat resistant, removable fastener for easy servicing. The blower 13 has fluid connection to the lower chamber 23 through an opening 45 in the air box front 40a.

In operation, any commercially available thermostat, not shown, that is compatible with the electrical connections of the heater 1, senses a low temperature in the room being heated. The blower 13 is activated and air is drawn through the air intake tube 3 outside of the exhaust pipe 39, through the openings 33, 35, 40, 45 into the lower chamber 23 and is forced into the heat exchanger 11 through the upper and lower portions, the elbow 31, and out the exhaust pipe 39. The hot surface igniter 43 is heated for a set period of time, before the gas valve 14 allows gas to flow into the burner 9. The pressure limit switch 15 senses the pressure differential between the upper and lower chambers 21, 23 caused by the blower 13, and if the differential is sufficient to indicate proper operation of the blower 13, gas is allowed to flow into the burner 9. The burner 9 has a venturi for efficient mixing of gas and primary air drawn from the air intake tube 3.

Exhaust gases from the burner 41 flow into the heat exchanger 11 and out through the exhaust pipe 39. As the exhaust gases flow around the heat exchanger 11, heat is transferred to room air drawn into a lower grill 47 of a cabinet front 49 and released through an upper grill 51.

As is known in electrical baseboards, a hot spot detector, a liquid filled copper tube, not shown, can run across the top of the base cabinet 5 for the length of the heat exchanger 11. It will shut down the heater 1 if dangerously high temperatures are detected. This can be caused when items are left on the top of the heater 1 so that they cover a portion of the upper grill 51. To discourage items from being placed over the upper grill 51, the front 49 is sloped slightly down toward the front of the heater 1.

Figure 5:
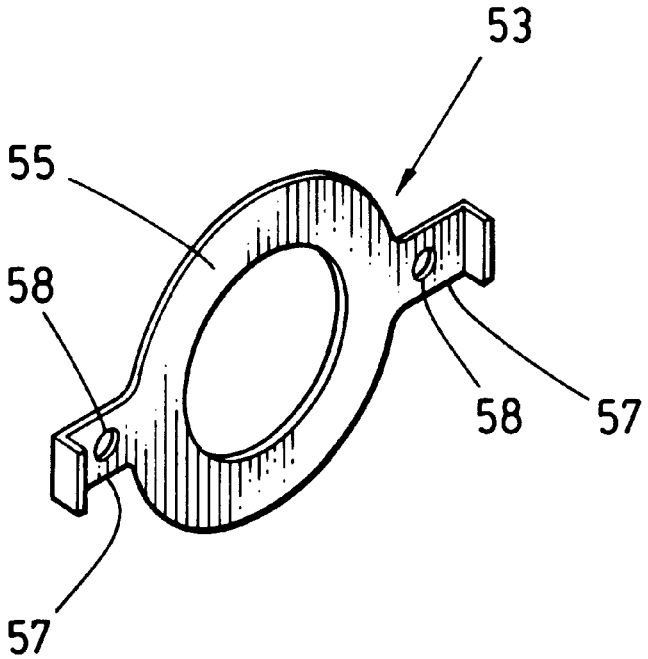
FIG. 5 is a perspective view of a mount flange for the air intake pipe of the heater of FIG. 1.

It is possible to have the heater 1 operate solely by natural convection, however the efficiency of the heater 1 would be limited as the transfer of heat to the room air cools the exhaust gases and reduces the amount of lift necessary to move the exhaust gases out of the heater 1. Even with a blower 13, the efficiency is limited by the possibility of condensation occurring in the exhaust gases when too much heat is drawn out of them, however it is possible to achieve efficiencies in the lower 80% range, or possibly more given favourable atmospheric conditions. The variables concerned are well known to those skilled in the art. Useful tools include the American Society of Heating, Refrigerating and Air Conditioning Engineers, Inc. (ASHRAE) Psychometric Charts for determining dew points and include efficiency line charts for determining exhaust gas losses for given temperatures and percentages of flue gases, for example the Nomograph for Determining Flue Losses with Natural Gas as set out in National Standard of Canada CAN1-2. 19-M81, Gas-Fired Gravity and Fan Type Direct Vent Wall Furnaces, as published by the Canadian Gas Association This description will now turn to specific improvements to air intake, exhaust and wall seals. Referring to FIGS. 1 and 3, the air intake tube 3 has a mount flange 53 at one end. Referring to FIG. 5, the mount flange 53 has a generally flat central ring 55 and two opposing tabs 57 that are bent at 90 degrees approximately one-quarter inch from the outer end of each tab 57. One opening 58 appears on each of the tabs 57. The openings 58 are simply used to hang the flange when it is being painted. The flange 53 fits about, and is welded flush with, one end of the air intake tube 3, the tabs 57 extending outwardly. Referring to FIG. 3, a resilient gasket 59 is glued to the flange 53.

Referring to FIGS. 3 and 6, outside of the opening 35 in the base cabinet 5, are two opposing stops 61, formed by punching in a portion of the base cabinet 5 that has been cut on three sides. Extending from the opening 35 spaced angularly away from the stops 61 are opposing keyhole cuts 63.

To mount the air intake tube 3, one need only align the tabs 57 and the cuts 63, and insert the tube 3 into the base cabinet. The tube 3 is then rotated until the tabs 57 fit into the stops 61. This indicates the proper position of the tube 3. bracket 27 are tightened down into the base cabinet 5, forcing the extruded opening 33 into the gasket 61 and sealing the tube 3 to the upper chamber 21.

Using the key hole configuration of tabs 57 and cuts 63 allows the tube 3 to be made from the same relatively light weight sheet metal with a baked enamel finish as the base cabinet 5.

The exhaust pipe 39 has a threaded end 64 to match threads in the elbow 31 which form an exhaust outlet within the air box 7. The exhaust pipe 39 is mounted by inserting the threaded end 63 through the openings 33, 35 and threading it into the elbow 31. The elbow 31 and pipe 39 are formed from standard stainless steel pipe, and may require the use of a pipe wrench, so it may be preferrable to mount the pipe 39 before mounting the tube 3. Stainless steel is used to prevent corrosion.

Referring to FIG. 8, providing tube 3 and pipe 39 that may be cut to length and installed in the field allows the thickness of a wall 67 to be measured with a measuring tape 69, and the tube 3 and pipe 39 to be cut using a tube cutter, not shown, or other cutting device. It is possible to saw the tube 3 and pipe 39, however it is not advised as rough edges may remain or sanding will be necessary. The tube 3 does not interfere with the cutting of the pipe 39, and vice versa. The remainder of the heater 1 does not interfere with the cutting of either the tube 3 or the pipe 39. Field installable, cut to length in the field, and installed in the field refer to those types of tools that a gas appliance installer would ordinarily employ in installing gas appliances, such as tube cutters and wrenches. Such tools would not include welding tools necessary to weld stainless steel.

Field installable tube 3 and pipe 39 reduce the overall dimensions of the heater 1 for transportation. The tube 3 and pipe 39 can be placed in a box parallel with the base cabinet 5 rather than projecting orthogonally from the base cabinet 5. Being able to cut tube 3 and pipe 39 to length means that only a single length of each of the tube 3 and pipe 39 need be provided by a manufacturer for different wall 67 thicknesses. These improvements can result in significant cost savings in transportation and economics of scale.

For the heater 1, the tube 3 may have an external diameter of approximately one and one-half inches, while the pipe 39 has an external diameter of approximately one inch. In this case, the tube 3 should extend approximately one inch from the wall 67 and the pipe 39 approximately two and one-half inches. This lessens the possibility of exhaust gases re-entering the air intake tube 3.

It will be evident to those skilled in the art that principles described for improvements to air intakes and exhaust are not limited to gas baseboard heaters, but can be extended to other direct vent appliances, not shown. There may need to be consequent modification to the overall dimensions of the various components depending on the internal design and output of the appliance.

It will also be evident that the key hole configuration of cuts and tabs is only one example of a manual insertion alignment and retention means. Those skilled in the art will be able to create others based upon the principles described herein.

Figure 10:
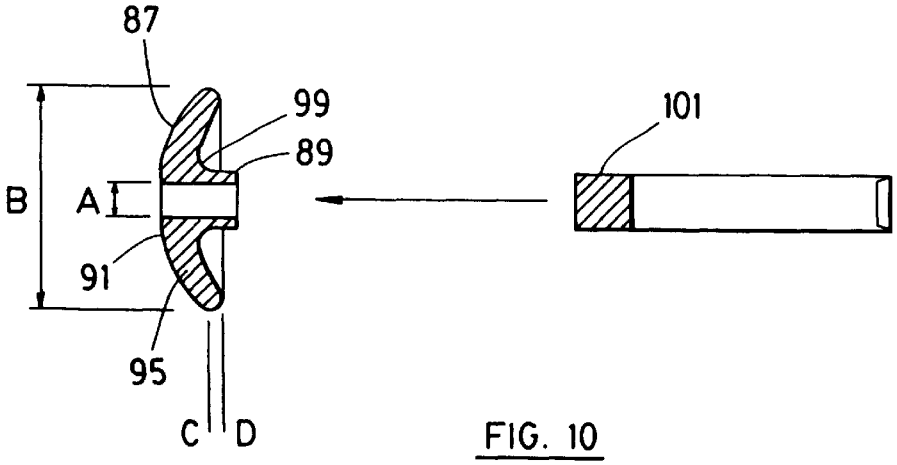
FIG. 10 is a cross-section showing the coupling of a weather seal and a wall sleeve of the kit of FIG. 9.
Figure 11:
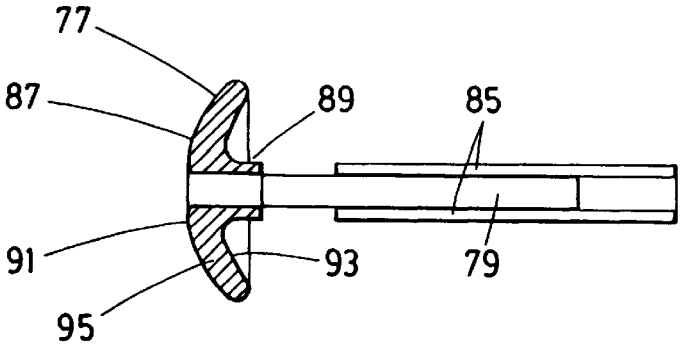
FIG. 11 is a cross-section of the coupled weather seal and wall sleeve of FIG. 10, together with pull straps.

Referring to FIG. 9, a weather vent seal kit 75 has a weather seal 77, a sleeve 79, a sleeve plug 81, an O-ring 83 and two pull straps 85. Referring to FIGS. 9, 10 and 11, the seal 77 is formed from a resiliently deformable material such as rubber. The rubber used in the preferred embodiment was provided by Wynn Precision Canada Limited, 255 Hughes Road, Orillia, Ontario L3V 2M3 under part no. WPC compound 3956.

The seal 77 in its normal position is a generally circular ring 87 with a generally tubular extension 89 from the ring 87. Referring to FIG. 10, the ring 87 has an inner circumference A and an external circumference B. It also has an upper surface 91 and a generally smooth lower surface 93. The surfaces 91, 93 extend from the internal circumference A to the external circumference B. There is a thickness 95 between the upper and lower surfaces 91, 93. The internal circumference A at the lower surface 93 lies in a first plane C, while the external circumference B at the lower surface 93 lies in a second, different and generally, parallel plane D.

The extension 89 is integral with the ring 87 and has the same internal circumference A as the ring 87. The extension 89 extends away from the lower surface 93. The depth of the seal 77 at the internal circumference A is approximately one inch, the internal circumference A is approximately two inches, while the external diameter in the normal position is approximately three and one-half inches. The thickness 95 is approximately one-eighth inch at the external circumference B and one-quarter inch at the internal circumference A, although there is some rounding 99 where the lower surface 93 and the extension 89 meet.

The seal 77 is deformable in at least two senses. First it is may be made smaller by squeezing and collapsing the external circumference B. Second it may be made larger by pushing on the lower surface 93 and bringing the plane C into line with the plane D causing the external circumference B to expand and the lower surface 93 to substantially flatten orthogonal to the axis of the extension 89.

The seal 77 is resilient in the sense that the seal 77 tends to return to its normal position unless deformed by outside forces. The thickness 95 is greater at the internal circumference A than the external circumference B in order to resist collapsing of the external circumference B due to stressing of the seal 77 when it 77 is flattened.

The wall sleeve 79 is generally tubular and rigid. The wall sleeve 79 may be formed from sheet metal or plastic or another preferrably non-corrosive material. PVC (polyvinyl chloride) pipe is a suitable material, as it inexpensive, light, bonds well with rubber and is easy to cut. The wall sleeve 79 is cut to the approximate depth of a wall 100 (see FIG. 12), plus seven-eighths of an inch to take into account the thickness 95 of the seal 77. It is advisable to use a tube cutter, not shown, to obtain a smooth cut on the sleeve 79. It is particularly difficult to obtain a straight cut using a hacksaw on PVC pipe.

The wall sleeve 79 is covered at one end to the depth of the seal 77 at the inner circumference A with an adhesive 101, for example PVC cement when using PVC pipe for the sleeve 79 and rubber for the seal 77. The end of the wall sleeve 79 with the adhesive 101 is inserted into the extension 89 until it is flush with the upper surface 91 and held steady until the adhesive 101 sets.

Referring to FIGS. 9 and 11, the straps 85 are rectangular strips, preferrably formed from PVC so that they 85 can be easily attached to the sleeve 79 using PVC cement. Although they 85 need not be rigid, it is preferrable that they 85 are rigid so that they 85 may be more easily reached as described below. The straps 85 extend approximately eight inches from the sleeve 89.

The plug 81 is press fit into the end of the wall sleeve 79 opposite the seal 77 until a stop 102 (see FIG. 9) meets the sleeve 79.

Figure 11A:
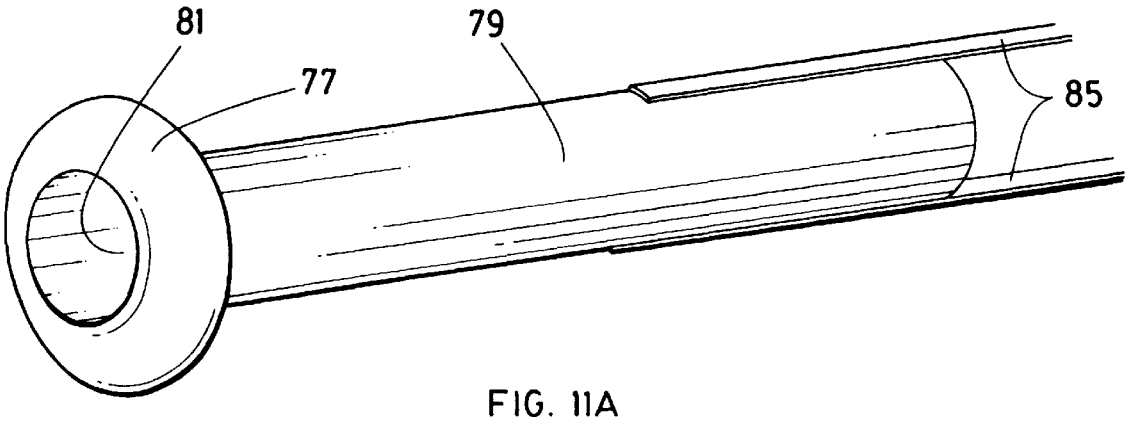
FIG. 11a is a perspective view of a seal assembly employing some of the components of FIG. 9.

Referring to FIG. 11a, the components, seal 77, sleeve 79, straps 85 and plug 81 form a seal assembly 103.

Figure 12A:
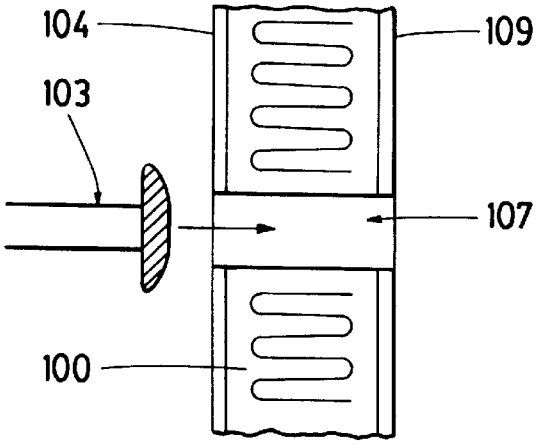
FIGS. 12(a) through 12(d) are a series of cross-sections showing the insertion of the weather vent seal kit of FIG. 9 through a wall.
Figure 12B:
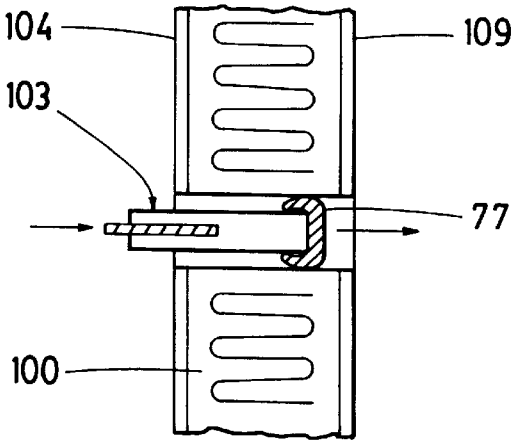
Figure 12C:
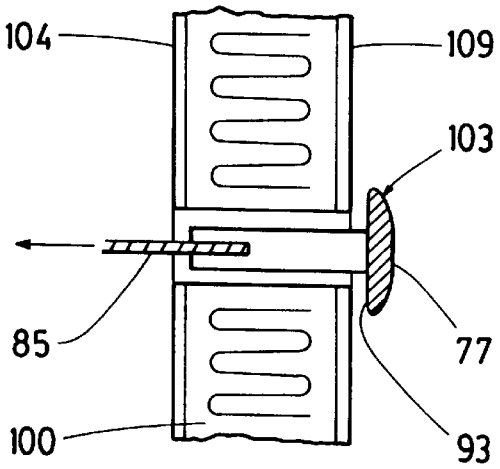
Figure 12D:
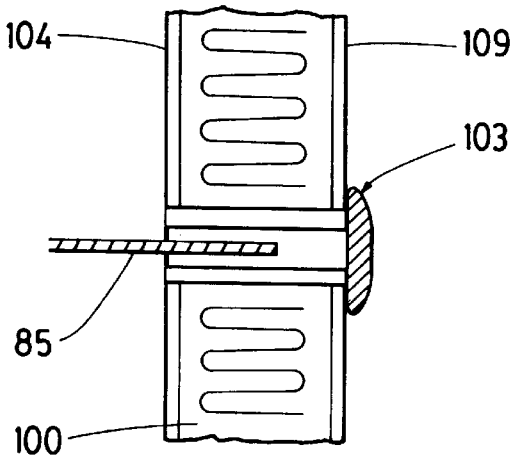

Referring to FIG. 12, the seal assembly 103 is inserted into the interior surface 104 of a wall 100 through a pre-cut hole 107 of approximately three inches in diameter (FIG. 12a). The seal 77 deforms by folding back and collapsing the external circumference B (FIG. 12b). When the seal 77 emerges from an exterior surface 109 of the wall 100, it 77 resiliently returns to its normal position (FIG. 12c). The straps 85 are then pulled back from the interior to retrieve the vent seal 75. When the lower surface 93 meets the exterior surface 109, the seal 77 is deformed and the lower surface flattens out to rest against the surface 109 and cover the hole 107.

Figure 13:
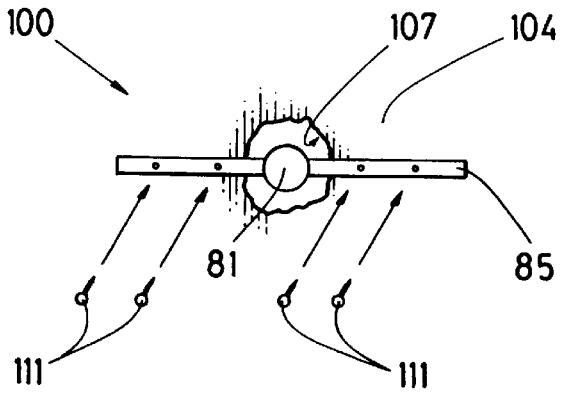
FIG. 13 is a diagrammatic front perspective view of the weather vent seal kit of FIG. 9 being secured at the interior of a wall.

Referring to FIG. 13, the straps 85 are bent back to meet the interior surface 104 and fastened by screws 111 or the like. Wall plugs or anchors, not shown, may be required depending on the wall 100 material.

Figure 14:
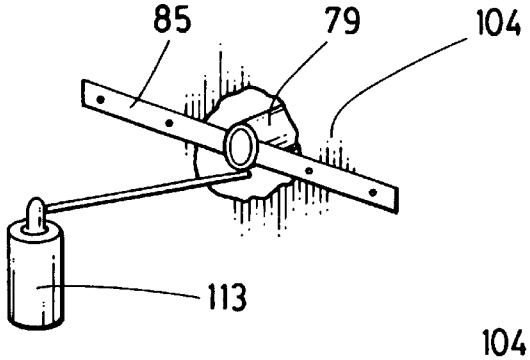
FIG. 14 is a diagrammatic front perspective view of insulation being installed around the weather vent seal kit of FIG. 9.

Referring to FIG. 14, expanding foam 113 is sprayed into the interior of the wall 100 around the wall sleeve 79 slowly, starting at the exterior surface 109 (see FIG. 12) and working toward the interior surface 104. The interior of the wall 100 should not be completely filled in order to allow room for the foam 113 to expand. Once the foam 113 is dry, any excess is cut away.

This results in a uniform, insulated, circular hole inside the sleeve 79 through the wall 100, sealed rom the interior of the wall 100, and sealed at the exterior surface 109. The hole 107 is otherwise covered at the exterior wall 109 by the seal 77 and presents a simple, clean and aesthetically pleasing finish.

It is possible to obtain an adequate seal on exterior surfaces that are not smooth or at right angles to the sleeve 79 due to the use of the foam to be described and the inherent flexibility of the rubber used in the seal 77, however care should be taken when installing the seal 77 in such situations to ensure that damage will not occur to the installation over time.

Figure 16:
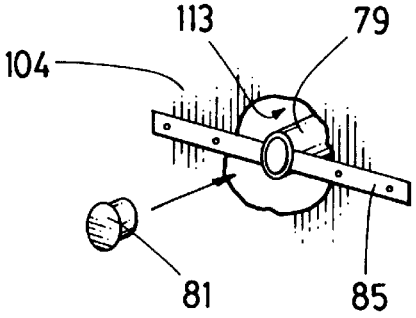
FIG. 16 is a diagrammatic front perspective view illustrating the removal of a plug from the weather vent seal kit of FIG. 9 in preparation for installation of the baseboard heater of FIG. 1.
Figure 15:
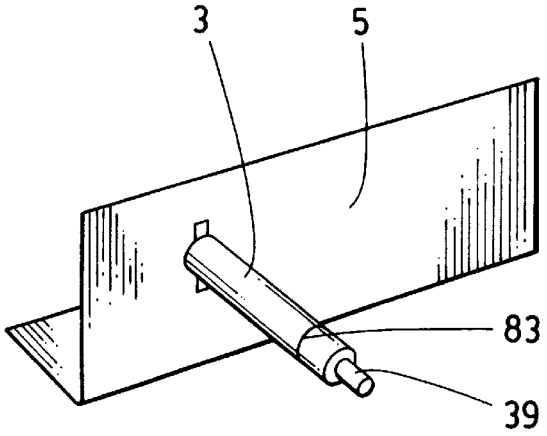
FIG. 15 is a perspective view from the rear, above and to the left of the base cabinet, air intake pipe and exhaust tube of the heater of FIG. 1 with an O-ring about the air intake pipe.
Figure 17:
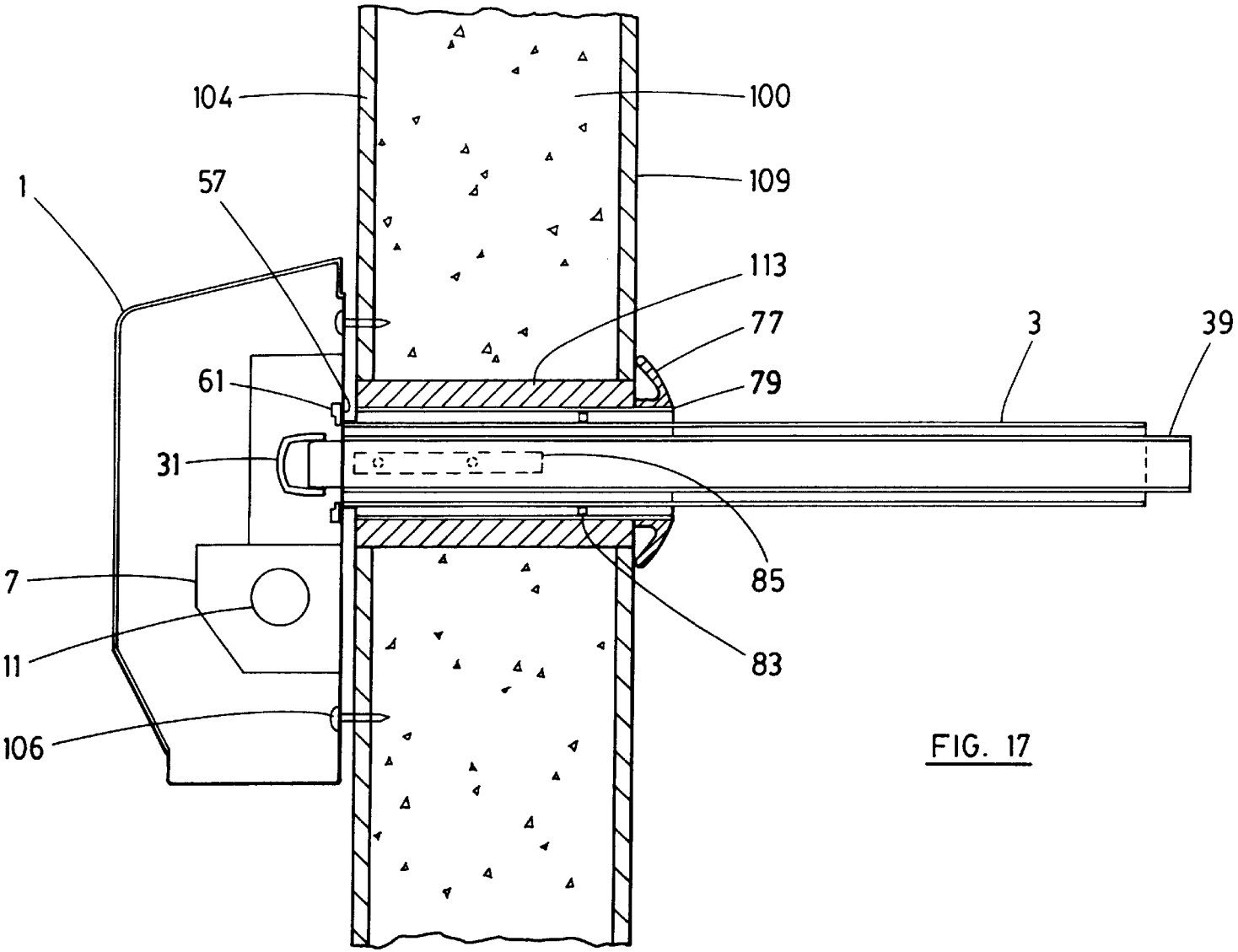
FIG. 17 is a cross section of an assembled vent seal kit of FIG. 9 and heater of FIG. 1, without a burner.

Referring to FIG. 15, the O-ring 83 is then fit snugly over the tube 3 to within approximately two inches of the end of the tube 3 away from the base cabinet 5. Referring to FIG. 16, the plug 81 is removed from the sleeve 79. The plug 81 serves to prevent undesired material, such as the foam 113, from entering the sleeve 79. It 81 also temporarily seals the sleeve 79 from drafts.

Petroleum jelly or an equivalent lubricant, not shown, is applied to the outside circumference of the O-ring 83. The tube 3 is inserted into the sleeve 79 until the base cabinet 5 meets the interior wall 100. The O-ring 83 seals the space between the tube 3 and the sleeve 79. In the preferred embodiment, the O-ring has an internal diameter of one and twenty-nine sixty-fourths inches and a body diameter of one and twenty-nine thirty-seconds inches.

The base cabinet is then fastened to the interior surface 104 with screws or other fastening means, 106. The heater 1 is connected to gas and electricity, not shown, and the front 40a is connected to the base cabinet 5.

A further advantage of the seal assembly 103 is that the heater 1 can be removed without danage or the need to re-insulate when the heater 1 is re-installed.

It is not strictly necessary for the internal circumference A and the external diameter B to be circular, however it provides uniform stressing of the upper surface 91 and the lower surface 93 so that the seal 77 lies substantially flat against the exterior surface 109. For example, a square ring, not shown, could be designed to provide a seal on the exterior wall 109, but causing it to lie flat might be difficult. Having a generally circular cross-section for sleeve 79, tube 3 and pipe 39 is preferrable for ease of manufacture and alignment.

It is not necessary to employ the vent seal kit 75 in order to exercise the benefits of the field installable tube 3 and pipe 39. Where the kit 75 is not employed, the seal 77 may still be used and installed from the exterior of the wall 100 after the heater 1 has been installed from the interior and foam has been injected from the exterior. In this case, the hole 107 need not be as large as it does not have to accommodate the sleeve 79. The internal diameter of the seal 77 can also be smaller, one and one-half inches for the heater 1 dimensions described herein.

As will be evident to those skilled in the art, the principles described for the vent seal kit 75 and its method of installation from the interior need not be restricted to gas baseboard heaters, nor to gas appliances. It may be employed to create uniform holes that are sealed at one surface, while being installed from an opposing surface. Sample applications might include clothing dryer hot air vents and wiring conduits.

It will be understood that this description is made with reference to the preferred embodiments of the invention. However, it is possible to make other embodiments that employ the principles of the invention and that fall within its spirit and scope as defined by the following claims.

I claim:

1. A weather vent seal kit comprising: a seal with a resiliently deformable ring having an internal circumference and an external circumference, an upper surface and a lower surface, each surface extending about the internal circumference from the internal circumference to the external circumference, and with a thickness between the upper surface and the lower surface, the external circumference being deformable inwardly when inserted into a hole of smaller diameter than the external circumference and the internal circumference being constant when inserted into a hole of greater diameter than the internal circumference, and the ring rebounds to its normal position when it emerges from the hole, and the ring substantially flattens when brought back toward the hole against a substantially flat surface about the hole, and a tubular sleeve of substantially the same outer contour as the internal circumference of the seal, and two straps.

2. A seal assembly comprising the kit of claim 1 assembled by inserting the sleeve through the lower surface at the first circumference until it is substantially flush with the upper surface, and bonding the sleeve to the ring.

3. A seal assembly comprising the kit of claim 1 assembled by inserting the sleeve through the internal circumference and the ring until the sleeve is substantially flush with the upper surface, and bonding the sleeve to the ring.

4. The seal assembly of claim 2 wherein the ring is rubber and the sleeve is a rigid pipe.

5. The seal assembly of claim 4 wherein the sleeve is PVC pipe.

6. A direct vent gas appliance comprising:

a field installable air intake tube and base cabinet combination having one or more corresponding key hole cuts or mating tabs on the air intake tube or base cabinet combination for inserting one end of the tube into the base cabinet when the cuts and tabs are aligned and for allowing the tube to be rotated once inserted so that the cuts and tabs are no longer aligned, and for preventing the tube from being removed from the base cabinet without re-aligning the cuts and tabs, and an exhaust pipe threaded on one end and a corresponding threaded exhaust outlet in an air box connected to the base cabinet, the exhaust pipe for being threaded to the exhaust outlet.

7. An appliance installation through a structure having a first surface and a second surface and a hole connecting the first and second surfaces, the installation comprising:

a direct vent gas appliance comprising, a field installable air intake tube and base cabinet combination having one or more corresponding key hole cuts or mating tabs on the air intake tube or base cabinet combination for inserting one end of the tube into the base cabinet when the cuts and tabs are aligned and for allowing the tube to be rotated once inserted so that the cuts and tabs are no longer aligned, and for preventing the tube from being removed from the base cabinet without re-aligning the cuts and tabs, and an exhaust pipe threaded on one end and a corresponding threaded exhaust outlet in an air box connected to the base cabinet, the exhaust pipe for being threaded to the exhaust outlet, and a seal with a resiliently deformable ring having an internal circumference and an external circumference, an upper surface and a lower surface, each surface extending about the internal circumference from the internal circumference to the external circumference, and with a thickness between the upper surface and the lower surface, the external circumference being deformable inwardly when inserted into a hole of smaller diameter than the external circumference and the internal circumference being constant when inserted into a hole of greater diameter than the internal circumference, and the ring rebounds to its normal position when it emerges from the hole, and the ring substantially flattens when brought back toward the hole against the second surface about the hole, and a tubular sleeve of substantially the same outer contour as the internal circumference of the seal, and two straps, wherein the appliance is installed against the first surface, and the intake tube and exhaust pipe extend from the appliance through the hole and through the ring, the ring being installed against the second surface.

8. An appliance installation through a structure having a first surface and a second surface and a hole connecting the first and second surface, the installation comprising:

a direct vent gas appliance comprising, a field installable air intake tube and base cabinet combination having one or more corresponding key hole cuts or mating tabs on the air intake tube or base cabinet combination for inserting one end of the tube into the base cabinet when the cuts and tabs are aligned and for allowing the tube to be rotated once inserted so that the cuts and tabs are no longer aligned, and for preventing the tube from being removed from the base cabinet without re-aligning the cuts and tabs, and an exhaust pipe threaded on one end and a corresponding threaded exhaust outlet in an air box connected to the base cabinet, the exhaust pipe for being threaded to the exhaust outlet, and a seal with a resiliently deformable ring having an internal circumference and an external circumference, an upper surface and a lower surface, each surface extending about the internal circumference from the internal circumference to the external circumference, and with a thickness between the upper surface and the lower surface, the external circumference being deformable inwardly when inserted into a hole of smaller diameter than the external circumference and the internal circumference being constant when inserted into a hole of greater diameter than the internal circumference, and the ring rebounds to its normal position when it emerges from the hole, and the ring substantially flattens when brought back toward the hole against a substantially flat surface about the hole, and a tubular sleeve of substantially the same outer contour as the internal circumference of the seal, and two straps, the seal and sleeve assembled to create a seal assembly by inserting the sleeve through the lower surface at the first circumference until it is substantially flush with the upper surface, and bonding the sleeve to the ring, wherein the seal assembly is installed through the hole with the ring substantially flattened against the second surface, the sleeve extending the depth of the hole to approximately the first surface, and the straps retain the assembly in place relative to the structure, wherein the appliance is installed against the first surface, the air intake has an O-ring on the outside of the air intake, and the air intake extends from the appliance through the sleeve and beyond the ring, the O-ring sealing the intake to the sleeve.

9. The appliance installation of claim 8, wherein the structure has an internal cavity about the sleeve that is filled with insulation after installation of the sleeve.

* * * * *